April 29, 1969

J. C. WEIDEL 3,441,459

METHOD AND APPARATUS FOR MAKING ENDLESS REINFORCED
WRAPPED PLASTIC TUBING

Filed Oct. 21, 1965

Sheet _1_ of 5

INVENTOR.
J. C. WEIDEL

BY George E. Pearson

ATTORNEY

INVENTOR.
J. C. WEIDEL

BY

*George E. Pearson*

ATTORNEY

United States Patent Office 3,441,459
Patented Apr. 29, 1969

3,441,459
METHOD AND APPARATUS FOR MAKING ENDLESS REINFORCED WRAPPED PLASTIC TUBING
Joseph C. Weidel, Riverside, Calif., assignor to Rohr Corporation, Chula Vista, Calif., a corporation of California
Filed Oct. 21, 1965, Ser. No. 499,572
Int. Cl. B31c 3/00; B29c 7/00; B29d 23/12
U.S. Cl. 156—195                                17 Claims

ABSTRACT OF THE DISCLOSURE

Endless reinforced plastic tubing is formed on a net advancing surface provided by circular mandrel segments of discrete length which are progressively advanced longitudinally in successive order while at least one of the mandrel segments is being returned to a starting position at which the advance begins. Each mandrel segment is T-shaped in cross section and has an abutting sliding connection with its adjacently disposed segments to thus provide a continuous annular surface upon which to form the tubing. Each segment has an inverted T-shaped sliding connection with a fixed mandrel shaft to provide for longitudinal movement of the mandrel segments on one end of the shaft. The shaft and thus also the mandrel segments are fixed against rotation by spaced releasable clamps which clamp the other end of the shaft and permit insertion of tube couplings onto the mandrel shaft. Each mandrel segment has a cam follower slot engaged by a shoulder shaped annular cam which has a gradual advance lead portion and a sharp return lead portion for respectively advancing and returning the segments as the cam is rotated by a pair of spaced releasable power drive connectors which permit insertion of the tube couplings onto the mandrel segments and also permit removal from or insertion of the mandrel segments into operative engagement with the cam ring and mandrel shaft. A plurality of supply reel support rings mounted for rotation concentrically of the mandrel shaft carry payoff heads or supply reels which feed and wrap resin impregnated tapes or rovings onto and circumferentially about the mandrel as the reel support rings rotate. Separate drives for the reel support rings permit certain of the rovings or tapes to be wrapped at the same or different speeds and in the same or opposite directions on the advancing mandrel surface to provide clockwise and/or counterclockwise helical tube sections having the same or different lead angles. An electrical heat source heat-cures the formed tubing as the same moves along the mandrel.

Background of the invention

This invention relates generally to the making of endless reinforced wrapped plastic pipe or tubing and more particularly to a new and improved method and apparatus for making tubing of this type on a mandrel of discrete length which effectively advances the formed tubing thereon whereby the same may be continuously manufactured without limit as to length.

Prior art methods for making endless tubing, such as exemplified by Patent Nos. 3,004,585 and 3,130,104, similarly employ mandrels of discrete length upon which are similarly wrapped resin impregnated elements, or arrays of elements, such as fiber glass rovings. The prior art mandrels, however, in order to advance the tubing formed thereon, necessarily are formed of tubular configuration and require a plurality of endless ribbon or chain type conveyor elements which are spaced circumferentially on the mandrel and driven longitudinally over the exterior surface thereof and thence returned internally of the mandrel.

This prior art mandrel construction, in addition to being complex and expensive to make and operate, has a number of inherent disadvantages and limitations due to the conveyor elements which necessarily extend outwardly of the mandrel supporting surface and in spaced relation thereabout. Thus, for example, if the bottom layer or roving is wound directly onto the longitudinally movable conveyor elements, the irregularity in the supporting surface of necessity is reproduced in the inner surface of the formed pipe. Such irregularity in the pipe surface tends to increase the amount of friction to fluid flow therein and this renders the resulting pipe product commercially unacceptable. Another difficulty with the conveyor element arrangement is the possibility of clogging due to resin getting between the conveyor elements and the surface of the mandrel which would prevent or greatly impair the operation of the conveyor elements on the mandrel. In order to avoid these difficulties, the prior art mandrels employ a thin flexible steel wrapper which is wound onto the moving conveyor elements to overlie the same and thereby minimize the surface irregularity and prevent any resin from coming into contact with either the conveyor elements or the mandrel. To this end, the wrapper underlies the first layer of fiber glass roving and serves as a separator layer. Since the wrapper does not become a part of the finished pipe product the same must be stripped away as the formed pipe leaves the mandrel. As a practical matter, although this necessarily adds to the complexity of the apparatus, provision is therefore made in the prior art mandrel arrangements for returning the steel wrapper as an endless element internally of the mandrel.

Summary of the invention

The mandrel arrangement of the present invention obviates any need for the conveyor and wrapper elements of the prior art mandrels and thus avoids their inherent functional difficulties, complexities, and attendant costs and maintenance problems. This improvement is made possible by a novel mandrel construction wherein the mandrel per se provides a continuously and progressively movable surface for longitudinally advancing the formed tubing thereon. In this construction, the mandrel comprises a plurality of slats or circumferentially disposed segments which are separately slidably mounted side by side for reciprocal movement longitudinally of the mandrel. Longitudinal reciprocal motion is imparted to the mandrel slats or segments by means of a rotating annular cam with which each slat has a separate driving connection. The cam has a gradual advance and relatively sharp return with the result that, at any instant of cam rotation, all but one of the mandrel segments are being progressively advanced by the cam and said one of the segments is being returned thereby. As otherwise expressed, the slats are returned one at a time in sequential order by the sharp return portion of the cam during each revolution of the cam. The return time for each cam thus corresponds to only a fraction of a revolution of the cam. During the remaining time of each revolution, however, each slat is relatively slowly advanced. It will be understood that the cam might have several annularly spaced gradual advance and sharp return portions such that the slats may be advanced and returned several times during each revolution of the cam and thus, if desired, more than one slat at a time may be returned.

Notwithstanding the fact that each reciprocable segment must be cyclically returned at least once during each revolution of the cam to renew its forward advance, the progressively advancing segments collectively create the effect of a longitudinally movable surface, and all that is required to effectively advance the formed tubing thereon is that there is a net forward moving support surface for the tubing, as when the composite supporting surface area of the progressively advancing mandrel segments exceeds that of the one, or more, segments which cyclically may be undergoing return movement by the rotating cam.

The mandrel arrangement of the present invention, moreover, is such that it provides the necessary continuous annular support for the tubing formed thereon without requiring a metallic separator wrapper in order to avoid the surface irregularities otherwise formed in the prior art endless pipe products. Although, in accordance with the mandrel construction and arrangement of the present invention, at least one slat necessarily must be moving back while the others are advancing, this reverse movement is only momentary and thus does not adversely impair the operation of the device or the surface quality and smoothness of the pipe products formed thereon.

By mounting a supporting shaft for the mandrel in a series of separable power drive connectors, it is possible to feed onto the mandrel various standard plastic nipples or couplings and to move them along the mandrel to the wrapping station where they can become bonded to and integrated with the plastic tubing.

Objects of the invention

An object of the present invention therefore is to provide a new and improved method and apparatus for making endless reinforced plastic tubing from resin impregnated elements.

Another object is to provide a mandrel for advancing the tubing formed thereon while also providing continuous annular support therefor.

Another object is to provide a mandrel for forming, supporting and advancing endless reinforced wrapped plastic tubing thereon free of distortion and wrinkling effects.

Another object is to provide a circumferentially segmented mandrel comprising longitudinally reciprocal segments in which the composite surface area of the advancing segments exceeds that of any returning segments.

Another object is to provide an arrangement for progressively advancing all but one of a plurality of mandrel segment surfaces while momentarily returning said one of said surfaces.

Another object is to provide an apparatus for making endless reinforced plastic tubing which incorporates a simple and unique means for imparting the necessary longitudinal motion to the formed tubing.

Still another object is to provide an apparatus which incorporates means for feeding onto a wrapping mandrel standard plastic nipples or couplings in order that they may be bonded to the plastic tubing.

Still other objects, features and advantages of the present invention will become more clearly apparent as the description proceeds, reference being had to the accompanying drawings wherein:

Description of the invention

Figure 6:
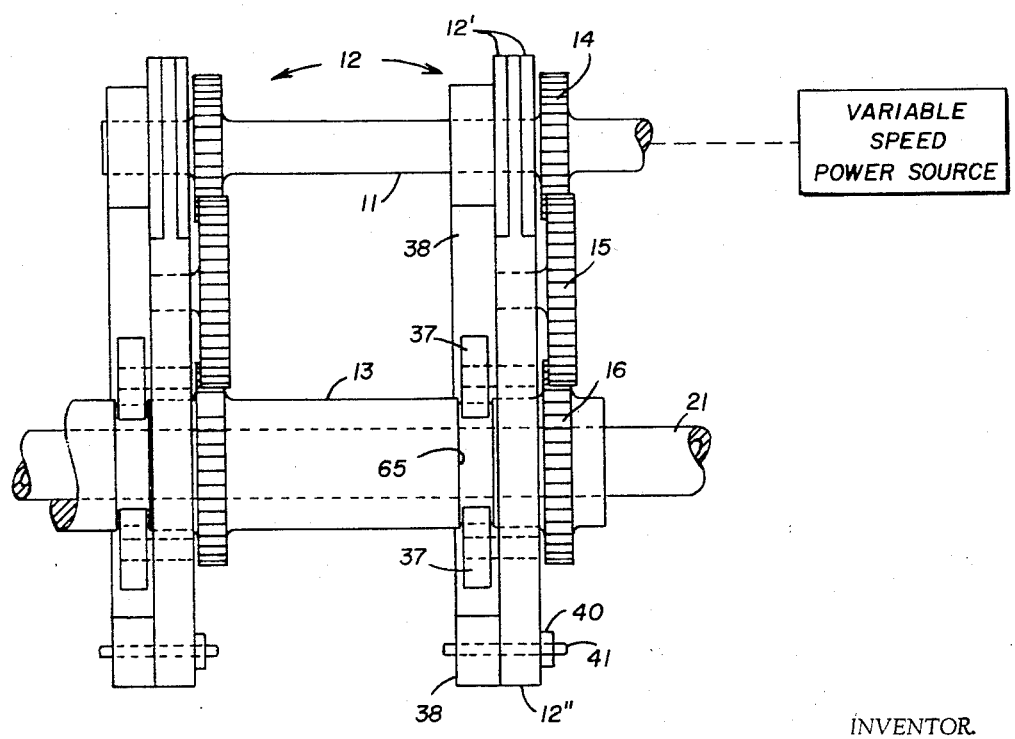
FIG. 6 is a view of the drive connection apparatus as seen along the line 6—6 of FIG. 1B.
Figure 5:
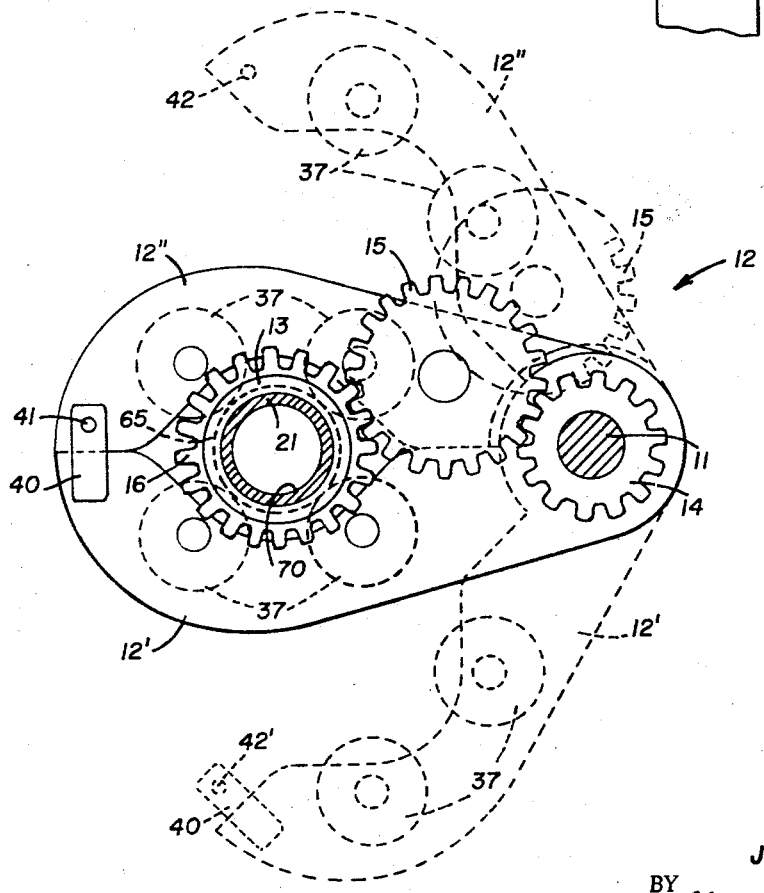
FIG. 5 is a sectional view taken along the line 5—5 of FIG. 1B.

Referring now to the drawings for a more complete understanding of the invention and first more particularly to FIGS. 1, 1A and 1B, 5 and 6, a shaft 11, best seen in FIGS. 5 and 6, is driven by a variable speed power source 8 shown in block diagram form in FIG. 6. Shaft 11, in turn, drives a hollow cam shaft 13 through the separable gearing of separate power drive connectors generally designated 12.

The drive connectors 12 are identical, spaced apart for a purpose subsequently to appear. Each connector comprises a pair of arms 12′ and 12″ which are pivotally supported on shaft 11 for swinging movement between the closed and open positions respectively depicted by the solid and dashed lines in FIG. 5. A plate member 38 for each connector is suitably secured to a base 9 and provides support for the arms 12′, 12″ and shaft 11, the shaft being journalled in the plate, for example, as shown in FIG. 6, and the closed arms 12′, 12″ being secured by a pin 41 which passes through aligned holes 42 and 42′ provided respectively in arm 12″ and a connecting lug 40 secured to arm 12′.

As the arms 12′ and 12″ are closed, two rollers 37 carried by each of arms 12′ and 12″ move into a groove 65 on cam shaft 13 to engage and rotatively support the same, and the rollers thus serve also to lock the cam shaft against axial movement. A gear 14 secured to drive shaft 11 engages an idler gear 15 carried by arm 12″, and the idler, in turn, when the arms 12′, 12″ are closed, engages a gear 16 secured to the cam shaft 13 to thus complete the separable power drive connection.

Figure 4:
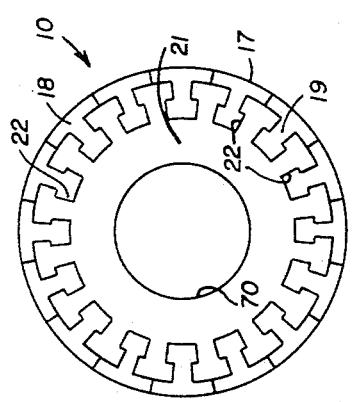
FIG. 4 is an end view of the mandrel as viewed along the line 4—4 of FIG. 2.

Cam shaft 13 is journalled upon a fixed hollow shaft 21 which is clamped against rotation at one end by two identical clamps generally designated 43, FIGS. 1, 1B and 7, these being spaced apart and separable from the shaft for a purpose subsequently to appear. The free or unclamped end of shaft 21 is enlarged and, as viewed in FIG. 4, has a plurality of equally spaced longitudinally grooves 22 of inverted T-shaped configuration formed therein.

A plurality of elongated mandrel segments or slats 17 of T-shaped cross section are slidably supported and retained in position on shaft 21 for reciprocable movement longitudinally thereof, the slats together with the enlarged shaft portion comprising the mandrel which is generally designated 10. Radially extending stem portions 19 of the slats are disposed slidably in interfitting relation within the correspondingly T-shaped grooves 22 in shaft 21, and sleeve portions 18 of the slats extend slidably in overlying relation to the exterior surface of the shaft. Each sleeve portion 18 of the slats, moreover, extends in abutting slidable engagement with sleeve portions of the adjacent slats to thus provide a continuous annular mandrel surface.

Figure 2:
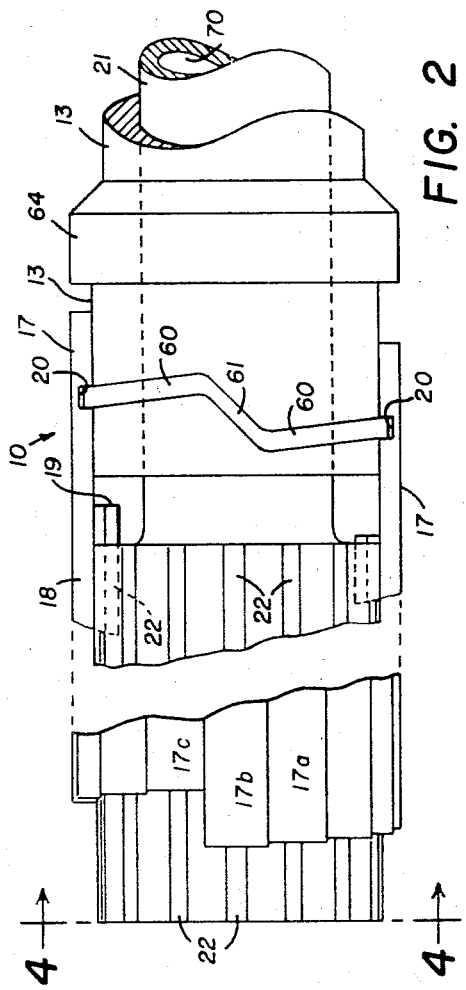
FIG. 2 is a fragmentary view, partly in section, of the wrapping mandrel and the rotating cam, certain of the mandrel segments being broken away to show the cam configuration.

As best seen in FIG. 2, the T-shaped configuration of each slat terminates short of the right end thereof, the remaining end portion being generally an extension of the sleeve portion 18 and being disposed in overlying relation to the cam shaft 13. This end portion of each slat is undercut or notched transversely as depicted at 20 to receive an annular shoulder shaped cam having a gradual advance lead portion 60 and a sharp return lead portion 61 which merge one within the other and preferably are formed integrally with the cam shaft for rotation therewith.

Figure 3:
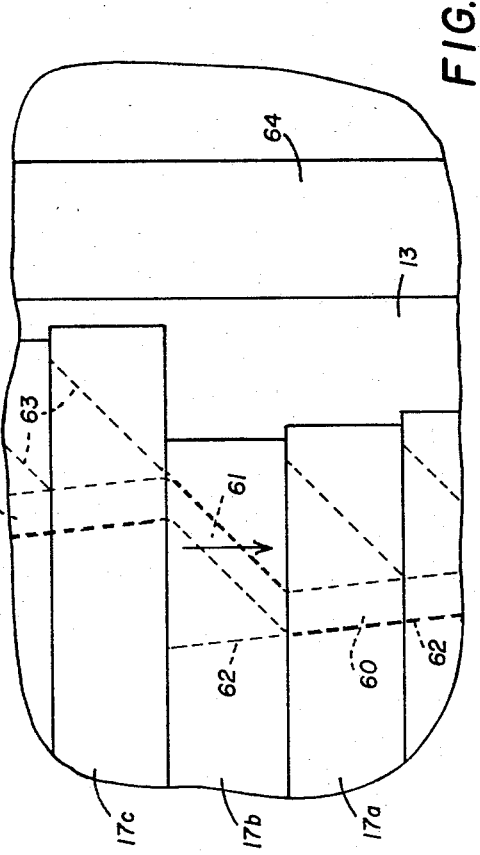
FIG. 3 is a fragmentary view, somewhat enlarged, of the sharp return portion of the cam shown in FIG. 2 and showing the coacting relationship of the mandrel segments therewith.

As best seen in FIG. 3, the cam follower notch 20 in each mandrel slat has one side wall 62 thereof which lies transversely of the slat at the same angle as the gradual advance portion 60 of the cam. The other side wall 63 of the notch lies transversely of the slat at the same angle as the sharp return portion 61 of the cam. The shape of notch 20 is thus such as to permit reverse movement of the slats as the same are engaged successively by the advance and return portions of the cam as the same rotates.

In order to provide an effectively advancing composite mandrel surface, the cam must rotate in the direction of the arrow shown in FIG. 3. As the cam rotates in this direction, the gradual advance portion 60 of the cam engages the cam follower surface 62 of each of the mandrel slats, such as slat 17c which is depicted in its fully returned position, and in a cam action therewith, advances the same progressively from its fully returned position through its last advancing position as depicted by slat 17a. As each slat moves into its fully advanced position as depicted by slat 17b, cam portion 60 moves to disengage cam follower surface 62 of the slat, and the sharp return portion 61 of the cam simultaneously moves to engage cam follower surface 63 of the slat. Cam portion 61, thence, in a cam action with cam follower surface 63, rapidly moves the slat to its fully returned position as depicted by slat 17C, at which time, cam portion 61 disengages from the cam follower surface 63 of the slat.

From the mandrel arrangement disclosed in FIGS. 2 and 3 it will thus be apparent that cam portion 61 moves through only one slat width at a time; that the mandrel slats are returned one at a time and in successive order during each revolution of the cam; that all but one of the slats are gradually advanced as that one is rapidly returned; and that the composite surface of the advancing slats gives the effect of a continuously advancing mandrel surface. It will be understood, however, that whereas in the arrangement disclosed only one slat returns at a time, other arrangements may be used such as where the return cam portion is less sharp and more than one slat at a time is returned thereby, or where more than one pair of advance and return cam portions are employed on the annular cam such that more than one slat is returned during each revolution of the cam. It will thus be apparent that the effectively advancing mandrel surface may be produced with one or more returning slats. All that is required in any workable arrangement is that the composite surface of the advancing slats exceeds that of the returning slats to provide a net advance and thus produce the resultant effect of a continuously advancing mandrel surface.

Cam shaft 13 has a shoulder 64 which is positioned at the point of return and initial advance of slats 17 and has an exterior surface which serves as a continuation of the composite mandrel surface provided by the slats.

The mandrel slats may readily be removed from the cam and shaft 21, or installed thereon, as the case may be. To this end, arms 12' and 12" of both power connectors 12 are opened to remove rollers 37 from grooves 65 provided therefor in cam shaft 13. This frees the cam shaft for axial movement along shaft 21 and permits withdrawal therewith of slats 17 from grooves 22 to thus permit radial movement of the slats to free the same from the cam. On installation, with the cam shaft withdrawn, the slats may be assembled in position on the cam and then advanced axially with the cam shaft for insertion into the grooves 22. The connectors 12 may then be closed, and the rollers 37 disposed within the grooves 65 to thus retain the parts axially in position.

Figure 1:
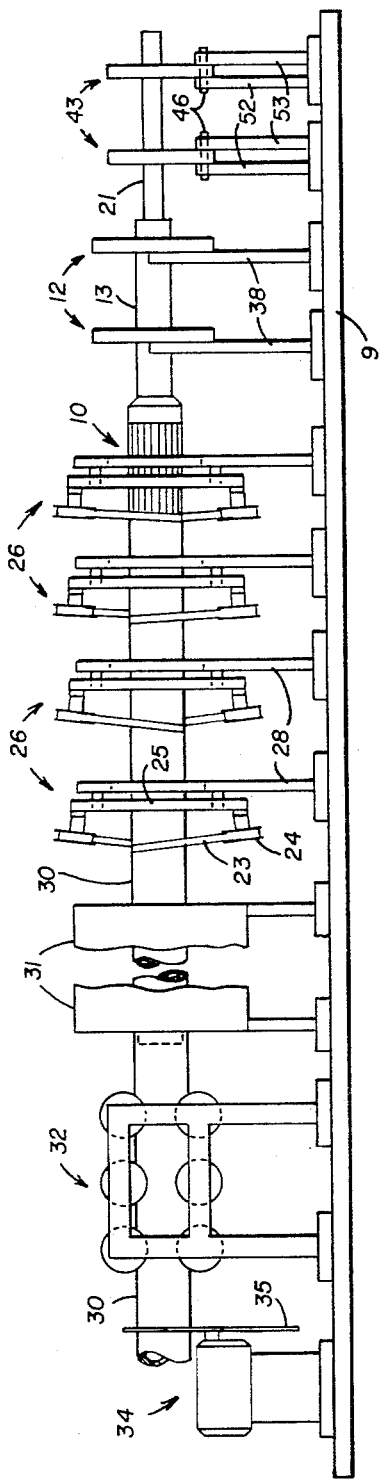
FIG. 1 is a schematic view of the apparatus used for producing the endless reinforced plastic tubing.
Figure 1A:
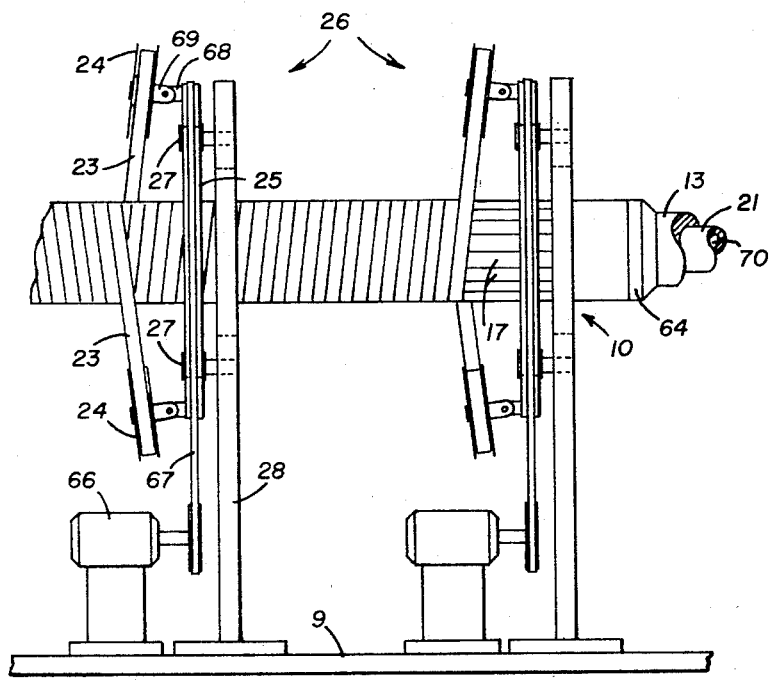
FIG. 1A is a schematic view, somewhat enlarged, showing a portion of the apparatus of FIG. 1 in the region of the mandrel.

As may best be seen in FIGS. 1 and 1A, endless tubing is formed on the effectively advancing composite surface of mandrel slats 17 by wrapping plastic impregnated tapes or rovings 23 thereon from pay off heads or supply reels 24 carried by the rotatably mounted rings 25 of a plurality of identical pay off head assemblies generally designated 26. Each ring 25 is mounted for rotation about the axis of mandrel 10 by a plurality of spaced roller supports 27 carried by a support plate 28 which is suitably secured to the base plate 9 and centrally apertured to clear the mandrel and the tubing being formed thereon.

Each pay off head assembly 26 has its own variable speed power unit 66, FIG. 1A, which drives its associated ring 25 by means of a suitable driving connection 67, which for the sake of simplicity, is shown to be a belt. The periphery of each ring is appropriately grooved to receive belt 67 which is trained over a pulley carried by the driving unit 66. While a belt drive has been shown, it will be understood that a chain drive is preferred in order to fix and maintain desired rotative relationships between the several pay off head assemblies.

Each pay off head 24 preferably is rotatively supported on a shaft 68 having a swivel connection 69 in order that the pay off heads may be set at an angle conforming to that of the tape being withdrawn therefrom, the lead angle of each tape being determined by the speed of rotation of its ring 25 and the speed of the effectively advancing mandrel surface as set respectively by the power units 66 and 8.

In the wrapping arrangement disclosed in FIG. 1, the same may typically be set such that the first and second pay off head assemblies 26 lay their tapes 23 down at the same angle on the mandrel but in opposite directions. Likewise, the third and fourth assemblies may similarly reverse the direction of feed of their tapes and lay the same down at the same angle. The feed angle of the third and fourth assemblies, however, may differ from that of the first and second assemblies, as shown. Other arrangements, of course, are possible in view of the variable settings of the individual power units 66, and it will be understood that the four pay off head assemblies disclosed are intended merely to be exemplary of the wrapping variations possible in the use of the apparatus of the present invention. Obviously, within practical limitations, as many assemblies may be employed as necessary to give a particular tube construction.

In the arrangement of FIG. 1, and as best seen in FIG. 1A, two pay off heads 24 are employed on each ring 25 and the speeds of power units 8 and 66 are such that the convolutions of the tapes alternate and abut on the mandrel to form a single ply. It will be apparent to those skilled in the wrapping art, however, that various other arrangements such as overlapping and/or bridging wrappings may be employed; one or more heads may be used on each ring; and one or more reels may be mounted on each pay off head support shaft. In one possible arrangement, for example, wherein resin impregnated glass rovings are supplied from a plurality of heads 24 on a plurality of rings 25, as depicted in FIG. 1, spools of "Mylar" tape may be mounted along side the heads of the first assembly 26 so that the "Mylar" tape may be the first to be layed down on the mandrel and thereby form a nonimpregnated parting layer thereon. Thus, when the formed tube 30 reaches the end of the advancing mandrel, the "Mylar" tape may readily be withdrawn through the central opening 70 provided in the hollow shaft 21.

The "Mylar" tape is a non-shrinking and non-streaching release material which does not adhere either to the mandrel or to the resin impregnated tapes or rovings.

Various tapes may be employed in the aforedescribed wrapping operation such, for example, as carbon or graphite fabric tape, bias or warp cut and impregnated with phenolic resin; high-silica fabric tape, warp cut and impregnated with phenolic resin; high strength glass rovings, or bidirectional glass fabric, impregnated with epoxy, polyester or phenolic resin; and structural tie laminate, bidirectional glass fabric tape, warp cut, or glass rovings, wet-dip coated with phenolic polyester, or epoxy resin.

As tapes 23 are wound around the mandrel 10 and moved therealong by the longitudinal motion of the advancing mandrel slats 17, the finished tubing 30 is formed on the mandrel and advanced thereon into and through the electric heater 31, the terminal free end of the mandrel being extended just beyond the left end of the heater, FIG. 1. Sufficient heat is generated within heater 31 to cure or set the resin material impregnated in or coated on the wrapped tapes 23 to establish the desired high strength level, and the overlapping or bridging joint sections are permanently bonded together such that the formed and heat-cured tubing is self-supporting as the same moves beyond the terminal end of the supporting mandrel 10.

Tubing 30 then moves into a roller drive unit 32 having a series of power driven rollers 33 which aid the mandrel in imparting longitudinal movement to the tubing. After passing through the roller drive unit 32, the tubing passes through a cut-off station where it may be cut to the desired length as by a suitable cutting unit 34 having a rotary cutting blade 35.

Figure 8:
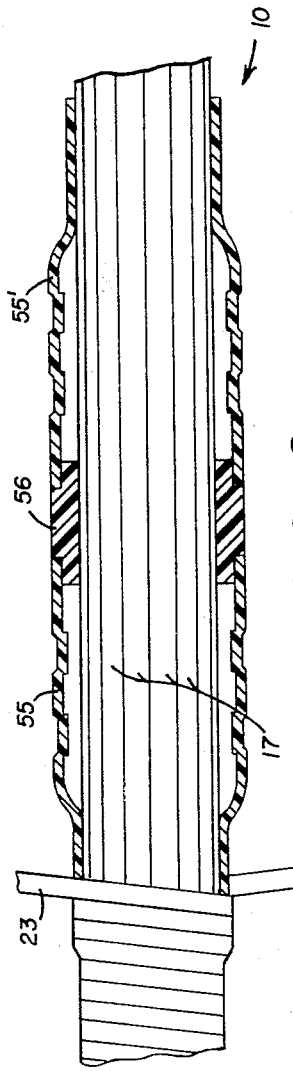
FIG. 8 is a fragmentary view of the mandrel showing how plastic couplings are bonded to the plastic tubing formed thereon.

The manner in which the plastic nipples or couplings 55 and 55' of FIG. 8 are mounted on the mandrel 10 and integrated into the formed tubing, will now be described, reference first being directed to FIGS. 1B and 7 for a more detailed description of the shaft clamps 43.

Figure 7:
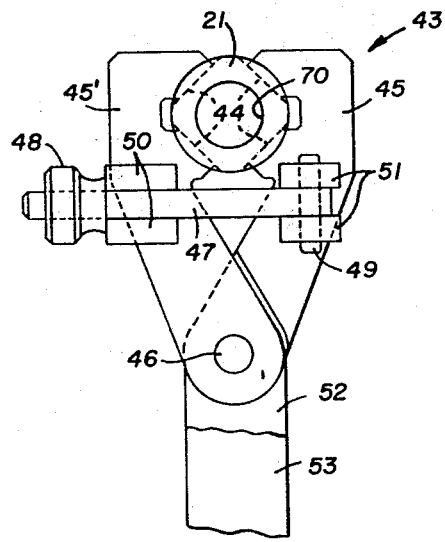
FIG. 7 is an end view of the shaft clamping apparatus as seen along the line 7—7 of FIG. 1B.

As best seen in FIG. 7, the clamped end of shaft 21 has flattened surfaces 44 against which the correspondingly shaped surfaces of a pair of clamping jaws 45 and 45' are positioned. Jaws 45 and 45' are pivotally connected by the pin 46 and secured together in locking engagement with shaft 21 by a rod 47 which is disposed between and pivotally connected as by a pin 49 to a pair of spaced lugs 51 carried by jaw 45. Rod 47 is received between a pair of spaced lugs 50 secured to jaw 45' and is threaded to receive the nut 48 which is tightened against lugs 50 to thus clamp shaft 21 against rotation.

Figure 1B:
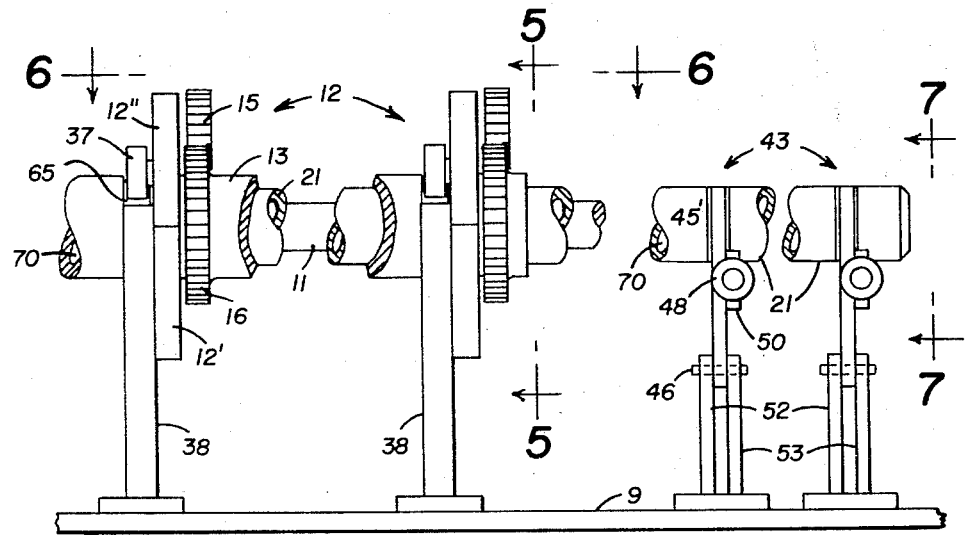
FIG. 1B is a schematic view, somewhat enlarged, showing the power drive connector and shaft clamping portions of the apparatus shown in FIG. 1.

As best seen in FIG. 1B, jaws 45, 45' are pivotally supported between a pair of spaced plates 52 and 53 to which pin 46 is secured, the plates, in turn, being suitably secured to base 9.

In mounting the couplings 55 and 55' of FIG. 8 on the mandrel, the end clamp 43 is opened and the couplings 55, 55', with the plug 56 interposed between them, are sleeved onto shaft 21. The end clamp is then closed and the inner clamp 43 and the power connector 12 adjacent thereto are opened. This permits movement of the couplings and plug onto cam shaft 13. The inner clamp 43 and its adjacent power connector 12 are then closed, and the inner power connector 12 is opened to permit movement of the couplings 55, 55' and plug 56 onto the mandrel as depicted in FIG. 8. The inner power connector is now closed and the tape wrapping is begun as disclosed in FIG. 8, the procedure being the same as in forming tubing 30. As a result, the couplings are wrapped with the impregnated tapes 23, move therewith along the mandrel as the tubing is formed, and become bonded to the tubing during the curing cycle within the heater 31. At the cutting station, the couplings are separated by cutting the same to remove the plug 56, the couplings and their bonded tubing then appearing as depicted by the coupling 55 and its bonded tubing 30' as shown in FIG. 9.

Figure 9:
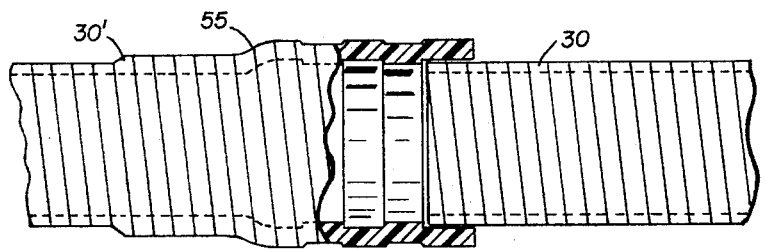
FIG. 9 is a fragmentary view showing a joint between sections of plastic tubing, one of which has a coupling bonded thereto.

As depicted in FIG. 9, it is now possible to insert a length of tubing 30 into the bell mouth type coupling 55 to form a simple joint connection therewith.

It is thus possible to insert couplings, or the like devices, onto the mandrel 10 without losing clamping control of the shaft 21, and without losing the rotative support and driving connection of the cam shaft 13 thereon, one clamp 43 being in effect to prevent rotation of shaft 21 while the other is open, and one separable driving connection 12 being in operation to drive the cam shaft through its gearing 14, 15, 16 and to rotatively support the same by its rollers 37 while the other drive connection 12 is open. It becomes unnecessary, therefore, in performing such insertion operations, to disturb other portions of the tube forming apparatus.

From the foregoing it will now be apparent that a novel and unique method and apparatus for making endless plastic tubing has been provided which is well adapted to fulfill the aforestated objects of the invention.

Having thus described the invention, what is claimed as new and useful and what is desired to be secured by Letters Patent is:

1. A method of producing tubing of unlimited length upon a fixed mandrel of discrete length, comprising the steps of reciprocally moving divisible surface portions of said mandrel longitudinally thereof while preventing rotation of the mandrel and its divisible surface portions about the axis of the mandrel, effecting a net advance of said reciprocally moving surface portions along the mandrel, and wrapping at least one tube forming element upon and circumferentially about said reciprocally moving mandrel surface portions whereby said wrapped element partakes of said net surface advance thereof, thereby to form continuous tubing on the mandrel in the form of an endless series of helical sections which advance longitudinally of the mandrel and beyond the end thereof.

2. The method as in claim 1 wherein said element is resin impregnated, and comprising the additional step of heat-curing the formed tubing as the same moves along the mandrel.

3. The method as in claim 1 and comprising the additional step of inserting a tube coupling element onto the mandrel to partake of said net surface advance thereof and for wrapping of said tube forming element thereabout, thereby to integrate the coupling element into said formed tubing.

4. The method as in claim 1 and comprising the additional steps of wrapping different tube forming elements at different speeds about the mandrel to partake of the net surface advance thereof whereby helical sections having different lead angles are formed from said different elements.

5. The method as in claim 1 and comprising the additional steps of wrapping a plurality of tube forming elements about the mandrel to partake of the net surface advance thereof, certain ones of said tube forming elements being wrapped at a first speed and in opposite directions about the mandrel thereby to form clockwise and counter clockwise helical sections having a first lead angle, and certain other ones of said tube forming elements being wrapped at a second speed and in opposite directions about the mandrel, thereby to form clockwise and counter clockwise helical sections having a second lead angle.

6. The method as in claim 1 and comprising the steps of advancing said reciprocally moving surface portions slowly by cam action and returning the same rapidly by cam action.

7. The method as in claim 1 and comprising the steps of advancing a majority of said reciprocally moving surface portions slowly by cam action while returning at least one of said surface portions rapidly by cam action.

8. The method as in claim 1 and comprising the step of advancing all but one of said reciprocally moving surface portions slowly and progessively by cam action while returning one of said surface portions rapidly by cam action.

9. The method as in claim 1 and comprising the steps of rapidly returning said reciprocally moving surface portions one at a time in successive order by cam action while slowly and progressively advancing by cam action the surface portions which are not undergoing said return movement, thereby to effect said net surface advance.

10. A method of producing reinforced wrapped plastic tubing of unlimited length upon a fixed mandrel of discrete length from endless resin impregnated elements, comprising the steps of reciprocally moving divisible surface portions of said mandrel longitudinally thereof while preventing rotation of the mandrel and its reciprocally moving divisible surface portions about the axis of the mandrel, effecting a net surface advance of said reciprocally moving surface portions, and wrapping said elements upon and circumferentially about said reciprocally moving surface portions selectively at different rotative speeds and selectively in opposite directions thereabout to form an endless series of adjacently disposed helical sections upon said reciprocally moving mandrel surface portions, thereby to form continuous tubing on the mandrel which advances longitudinally of the mandrel and beyond the end thereof.

11. A mandrel for forming and advancing endless tubing thereon comprising a plurality of elongated cylindrical segments separately slidably mounted for relative reciprocal movement longitudinally of the mandrel in abutting engagement each with its adjacently disposed segments and providing a continuous annular tube supporting surface, and variable lead rotative cam means for relatively reciprocating said segments in alternately advancing and returning movements so that at any time the composite surface area of the advancing segments exceeds that of any returning segments.

12. In apparatus for producing tubing of unlimited length from a resin impregnated tube forming element, a fixed mandrel of finite length mounted at a work station for initial support of the element as the same is wrapped thereon, means disposed at one end of the mandrel for holding the same against rotation, said mandrel having longitudinally movable segments slidably mounted and retained thereon, means for wrapping said tubing element circumferentially about and upon said movable segments, and variable lead cam means operatively engaged with each of said movable segments to cyclically advance and retract the same and produce the effect of an advancing mandrel surface whereby tubing formed thereon is advanced relative to the mandrel.

13. In apparatus for producing tubing as in claim 12 and comprising in combination with said mandrel, means disposed at the work station for heating and curing said formed tubing before the same moves beyond the end of the mandrel.

14. A mandrel for forming continuous tubing, comprising, a fixed shaft supported at one end against rotation, a plurality of elongated cylindrical segments mounted about the free end portion of said shaft for reciprocal sliding movement thereon longitudinally of the shaft and providing a continuous annular surface thereabout, and cam means rotatably supported on said shaft and engageable separately with said segments in a cam action therewith to move a majority of the same slowly and progressively in the direction of the free end of the shaft while rapidly returning at least one of the segments as the cam means is rotated.

15. A mandrel as in claim 14, said cam means comprising an annular cam having a gradual advance lead portion and a sharp return lead portion, and said segments each having cam follower means in engagement with said cam.

16. A mandrel as in claim 14, said shaft having circumferentially spaced and longitudinally extending grooves, said segments having longitudinal portions disposed within said longitudinal grooves and interlocked slidably therewithin, said cam means comprising a cam shaft journalled on said fixed shaft and a shoulder type annular cam secured to the cam shaft and having a gradual advance lead portion and a sharp return lead portion, and said segments respectively having cam follower notches for receiving said cam.

17. A mandrel as in claim 16, and further comprising a pair of spaced clamps for releasably engaging said fixed shaft to separately support the same against rotation, and a pair of spaced driving connections for separately rotatively supporting and driving said cam shaft.

References Cited
UNITED STATES PATENTS 3,325,327    6/1967    Swan _____ 156—429 XR
2,845,109    7/1958    Schneider _____ 156—429
3,155,757    11/1964    Kramer et al. ____ 156—143 XR PHILIP DIER, *Primary Examiner.*

U.S. Cl. X.R.

156—294, 432, 443